(12) United States Patent
Nie et al.

(10) Patent No.: US 11,162,973 B2
(45) Date of Patent: Nov. 2, 2021

(54) THREE-AXIS PIEZOELECTRIC ACCELEROMETER

(71) Applicant: FATRI UNITED TESTING & CONTROL (QUANZHOU) TECHNOLOGIES CO., LTD., Fujian (CN)

(72) Inventors: Yongzhong Nie, Fujian (CN); Chuan Nie, Fujian (CN)

(73) Assignee: FATRI UNIED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 39 days.

(21) Appl. No.: 16/613,799

(22) PCT Filed: Jun. 8, 2018

(86) PCT No.: PCT/CN2018/090430
§ 371 (c)(1),
(2) Date: Nov. 15, 2019

(87) PCT Pub. No.: WO2018/224036
PCT Pub. Date: Dec. 13, 2018

(65) Prior Publication Data
US 2020/0174034 A1 Jun. 4, 2020

(30) Foreign Application Priority Data

Jun. 9, 2017 (CN) .......................... 201720671272.3

(51) Int. Cl.
*G01P 15/09* (2006.01)
*G01P 15/18* (2013.01)
*G01P 1/02* (2006.01)

(52) U.S. Cl.
CPC .......... *G01P 15/09* (2013.01); *G01P 15/0907* (2013.01); *G01P 15/0915* (2013.01); *G01P 15/18* (2013.01); *G01P 1/023* (2013.01)

(58) Field of Classification Search
CPC ...... G01P 15/09; G01P 15/18; G01P 15/0907; G01P 15/0915; G01P 15/0922; G01P 15/0802; H01L 41/1132; H01L 41/053
See application file for complete search history.

(56) References Cited

U.S. PATENT DOCUMENTS 4,075,525 A * 2/1978 Birchall .................... G01L 1/16
310/329
4,941,243 A * 7/1990 Cleveland ........... G01P 15/0915
29/25.35
(Continued)

FOREIGN PATENT DOCUMENTS

CN 2556648 Y 6/2003
CN 202025016 U 11/2011
(Continued)

OTHER PUBLICATIONS

Translation of CN202025017.*
The International Search Report for PCT/CN2018/090430, dated Aug. 29, 2018, 14 pages.

*Primary Examiner* — Helen C Kwok
(74) *Attorney, Agent, or Firm* — Law Offices of Liaoteng Wang

(57) ABSTRACT

A three-axis piezoelectric accelerometer, comprising: a housing, three charge output elements arranged inside the housing, and a connector electrically connected to the three charge output elements, wherein the three charge output elements are respectively used for detecting vibrations in directions along X-axis, Y-axis and Z-axis which are perpendicular to each other in pairs. The charge output element comprises: a support comprising a connecting part; a piezoelectric element being an annular structural body, wherein the piezoelectric element is connected to the connecting part in a sheathed manner and is provided with a first deformation groove penetrating a side wall of the piezoelectric element to disconnect the piezoelectric element in a circumferential direction; and a mass block being an annular structural body, wherein the mass block is connected to the piezoelectric element in the sheathed manner, and the piezoelectric element is in interference fit with the connecting part and the mass block.

11 Claims, 6 Drawing Sheets

(56) References Cited

U.S. PATENT DOCUMENTS

| | | | | |
|---|---|---|---|---|
| 5,572,081 A * | 11/1996 | Starck | ............... | G01P 15/0915 |
| | | | | 310/329 |
| 5,847,278 A | 12/1998 | Judd | | |
| 6,038,924 A * | 3/2000 | Lee | ............... | G01P 15/09 |
| | | | | 310/329 |
| 6,279,395 B1 * | 8/2001 | Insalaco | ............... | G01L 1/16 |
| | | | | 310/329 |
| 2018/0196081 A1 * | 7/2018 | Nie | ............... | G01P 15/0802 |

FOREIGN PATENT DOCUMENTS

| | | | |
|---|---|---|---|
| CN | 202025017 U | 11/2011 | |
| CN | 202049175 U | 11/2011 | |
| CN | 202049177 U | 11/2011 | |
| CN | 103604949 A | 2/2014 | |
| CN | 203798824 U | 8/2014 | |
| CN | 206906417 U | 1/2018 | |
| WO | 2016206094 A1 | 12/2016 | |

* cited by examiner

THREE-AXIS PIEZOELECTRIC ACCELEROMETER

CROSS-REFERENCE TO RELATED APPLICATION

This application is a National Stage of International Application No. PCT/CN2018/090430, filed on Jun. 8, 2018, which claims priority to Chinese Patent Application No. 201720671272.3, filed on Jun. 9, 2017, both of which are incorporated herein by reference in their entireties.

TECHNICAL FIELD

The disclosure relates to the technical field of accelerometer, and in particular to a three-axis piezoelectric accelerometer.

BACKGROUND

The embodiment of the disclosure provide a three-axis piezoelectric accelerometer, which has good frequency response characteristics and resonance performance, and also has good high temperature characteristics, thereby greatly reducing the problem of stress fluctuation when used in a high temperature environment and ensuring the accuracy of the detection result.

In an aspect, a three-axis piezoelectric accelerometer according to an embodiment of the disclosure includes a housing, three charge output elements disposed inside the housing, and a connector electrically connected to the three charge output elements, wherein the three charge output elements are respectively configured to detect vibrations in directions along a X-axis, a Y-axis, and a Z-axis, and the X-axis, the Y-axis, and the Z-axis are perpendicular to each other in pairs, wherein each of the three charge output elements includes a support including a connecting part; a piezoelectric element, which is an annular structural body and connected to the connecting part in a sheathed manner, wherein the piezoelectric element is provided with a first deformation groove penetrating a side wall of the piezoelectric element to disconnect the piezoelectric element in a circumferential direction thereof; and a mass block, which is an annular structural body and is connected to the piezoelectric element in the sheathed manner, and wherein the piezoelectric element is in interference fit with the connecting part and the mass block.

According to an aspect of the embodiment of the disclosure, the mass block is provided with a second deformation groove penetrating a side wall of the mass block to disconnect the mass block in a circumferential direction thereof, and each of the three charge output elements includes a pre-tightening ring which is connected to the mass block in the sheathed manner and is in interference fit with the mass block.

According to an aspect of the embodiment of the disclosure, the first deformation groove is a strip groove and extends along an axial direction of the piezoelectric element, and the second deformation groove is a strip groove and extends along an axial direction of the mass block, and each of the first deformation groove and the second deformation groove has a width no more than 0.2 mm, and the width is the distance between two opposite sections formed at the first deformation groove or the second deformation groove.

According to an aspect of the embodiment of the disclosure, linear expansion coefficients of the pre-tightening ring, the mass block, the piezoelectric element, and the connecting part decrease sequentially.

According to an aspect of the embodiment of the disclosure, the piezoelectric element is made of a piezoelectric ceramic or a quartz crystal, and the piezoelectric element includes opposing inner and outer annular surfaces, each of the inner annular surface and the outer annular surface is provided with a conductive layer, the inner annular surface of the piezoelectric element is connected to the connecting part in the sheathed manner, and the mass block is connected to the outer annular surface of the piezoelectric element in the sheathed manner.

According to an aspect of an embodiment of the present application, the support further includes a supporting part, the connecting part has a columnar structure, and the supporting part has a disc-like structure disposed around the connecting part and is located at one end of the connecting part.

According to an aspect of the embodiment of the disclosure, the three-axis piezoelectric accelerometer further includes a circuit board and a shielding cover, wherein the circuit board is fixed to the mass block, the piezoelectric element and the connector are electrically connected the circuit board, the shielding cover is snap-fitted to the support, and the piezoelectric element, the mass block and the circuit board are all located inside the shielding cover.

According to an aspect of the embodiment of the disclosure, the housing is provided with an accommodating portion, the three-axis piezoelectric accelerometer further includes a support base disposed inside the accommodating portion, the support base includes a base portion connected to the housing and a convex column connected to the base portion, one of the three charge output elements is disposed on the base portion, and the other two of the three charge output elements are disposed on the convex column.

According to an aspect of the embodiment of the disclosure, the three-axis piezoelectric accelerometer further includes a lid for closing or opening an opening of the housing, a mounting hole is provided on the lid, and a top of the convex column is inserted into the mounting hole and connected to a hole wall of the mounting hole.

According to an aspect of the embodiment of the disclosure, the convex column is provided with a first through hole coaxially disposed with the mounting hole, and the housing is provided with a second through hole disposed in alignment with the first through hole.

The three-axis piezoelectric accelerometer according to the embodiment of the disclosure includes the charge output element, which includes the support, the piezoelectric element, and the mass block. Since the piezoelectric element are in direct contact with and are in interference fit with the connecting part and the mass block, there is no need to provide an intermediate connecting layer, thereby improving the overall rigidity of the charge output element and improving the frequency response characteristic of the charge output element, and also greatly reducing the problem of stress fluctuation when used in a high temperature environment, so as to obtain a good high temperature characteristics. Thus, the three-axis piezoelectric accelerometer having this charge output element has good frequency response characteristics and resonance performance and can ensure the accuracy of the detection result.

BRIEF DESCRIPTION OF THE DRAWINGS

Features, advantages, and technical effects of the exemplary embodiments of the disclosure will be described below with reference to the accompanying drawings.

Figure 1:
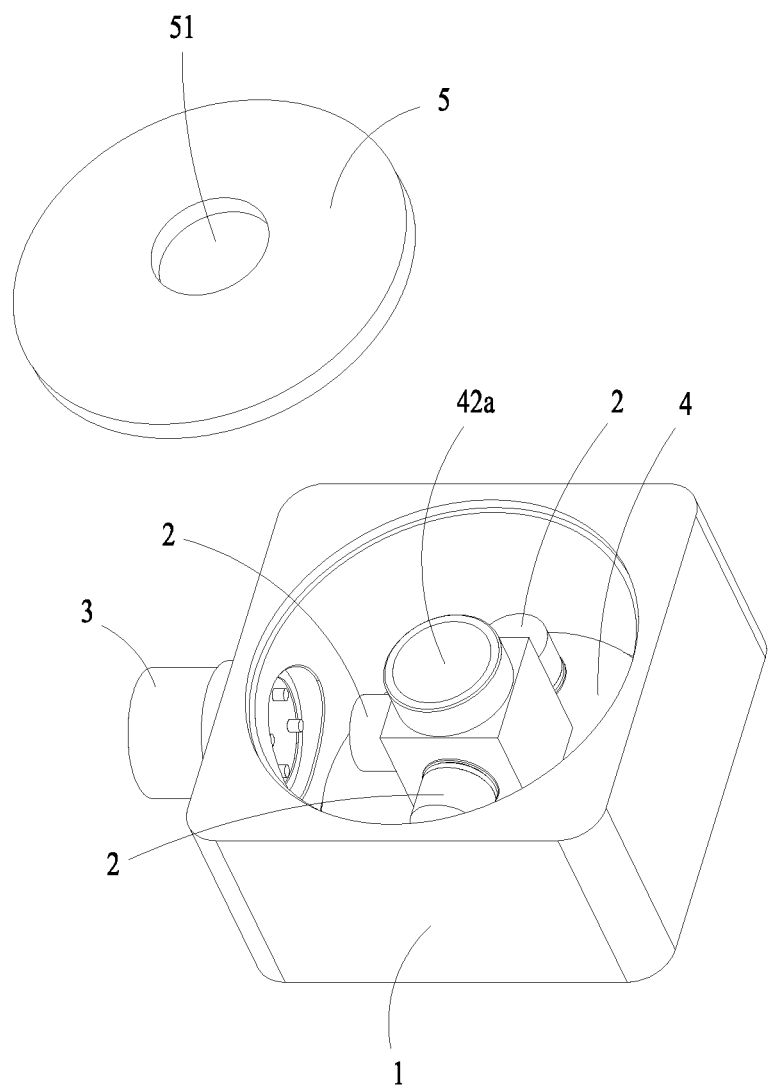
FIG. 1 is a schematic exploded view of a three-axis piezoelectric accelerometer according to an embodiment of the disclosure.

In the drawings, the drawings are not drawn to scale.

DETAILED DESCRIPTION

Implementations of the disclosure will be further described in detail below in conjunction with the drawings and embodiments. The detailed description of the embodiments and the accompanying drawings are intended to illustrate the principle of the disclosure but are not intended to limit the scope of the disclosure, i.e., the disclosure is not limited to the described embodiments.

In the description of the disclosure, it should be noted that, unless otherwise stated, the meaning of "multiple" is two or more; the orientation or positional relationship indicated by the terms "upper", "lower" "inside", "outside" and like is merely for the convenience of the description of the disclosure and the simplification of the description, and does not indicate or intend that the involved device or element must have the specific orientation or must be configured or operated in a specific orientation, and therefore, should not to be construed as a limitation to the disclosure. Moreover, the terms "first", "second", "third", and the like are only used for the purpose of description, and should not to be construed as indicating or implying relative importance. The orientation words appearing in the following description refer to the directions shown in the drawings, and are not intended to limit the specific structure of the specific structure of the disclosure. In the description of the disclosure, it should be noted that, unless otherwise stated and defined, the terms "mount", "connect with", and "connect to" are to be understood broadly. The specific meaning of the above terms in the disclosure may be understood by the skilled in the art based on the specific situation.

For a better understanding of the disclosure, a three-axis piezoelectric accelerometer according to the embodiments of the disclosure will be described in detail below with reference to FIGS. 1 to 6.

The three-axis piezoelectric accelerometer according to the embodiment of the disclosure is used to detect the vibration condition of a structural member to be tested, and is capable of collecting the vibration condition of the structural member to be tested in the spatial three-dimensional coordinate system. The three-axis piezoelectric accelerometer can collect vibration data of the structural member to be tested, and further convert the vibration data into an electrical signal, and then transmit the electrical signal to other device for subsequent analysis processing.

Figure 2:
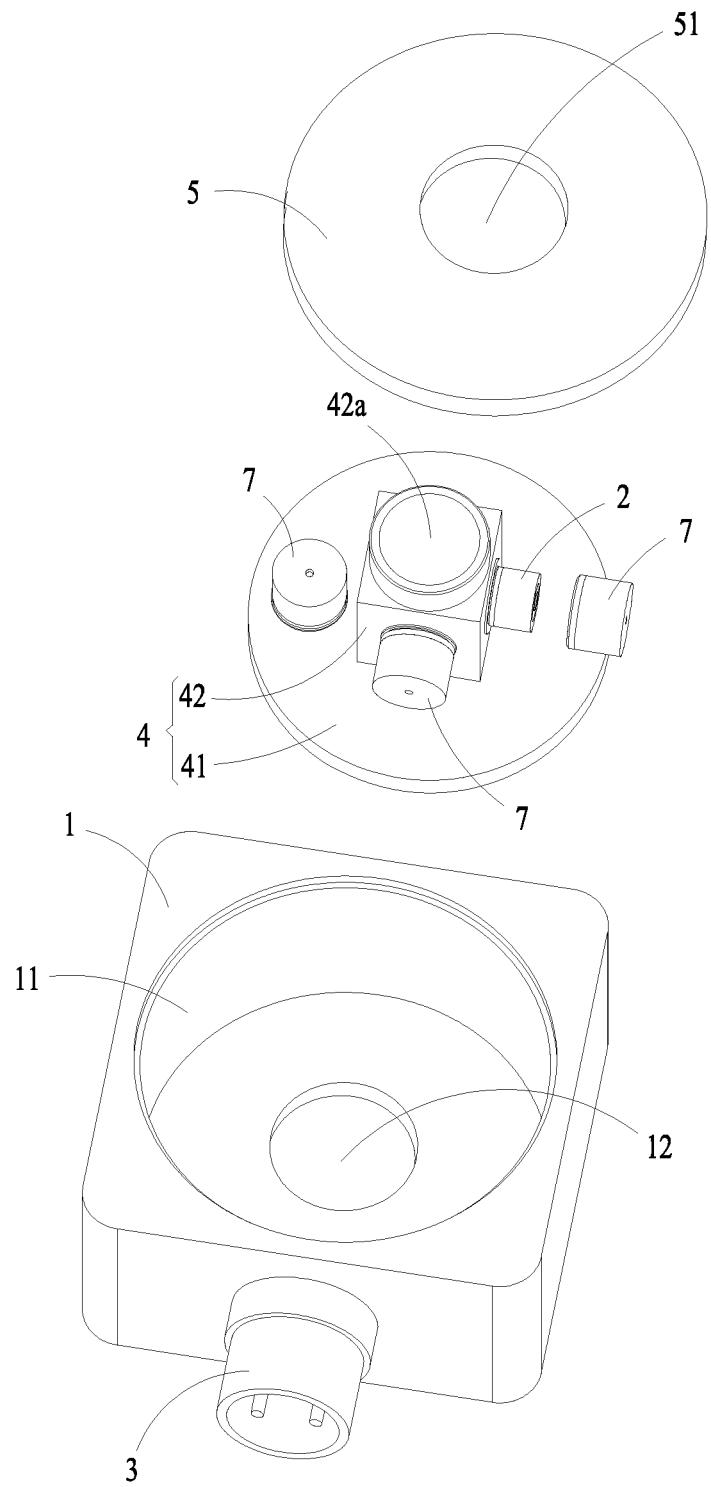
FIG. 2 is a schematic exploded view of a three-axis piezoelectric accelerometer according to another embodiment of the disclosure.
Figure 3:
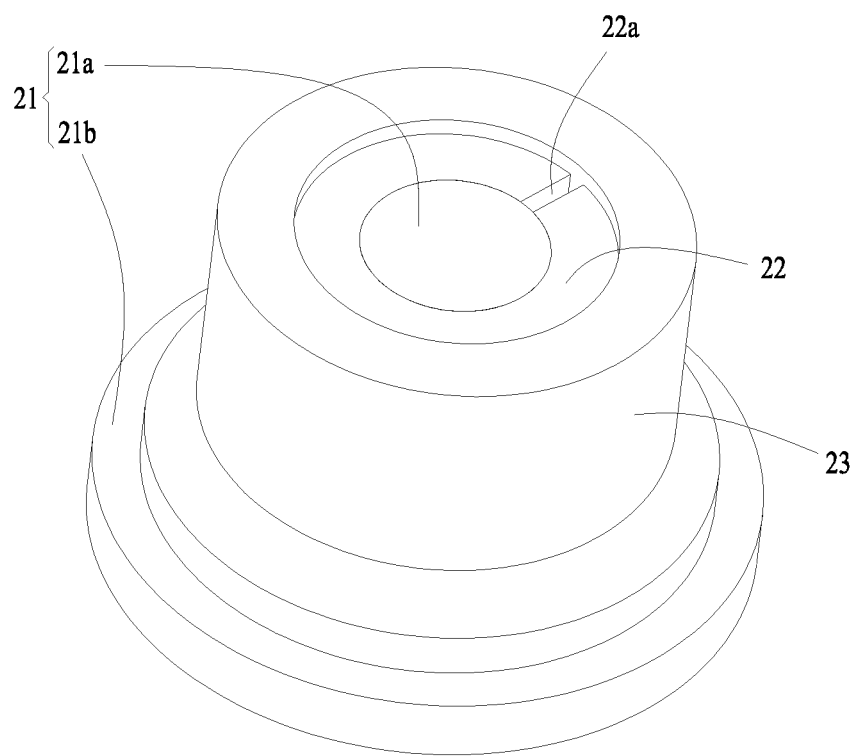
FIG. 3 is a schematic structural view of a charge output element according to an embodiment of the disclosure.

As shown in FIG. 1 and FIG. 2, the three-axis piezoelectric accelerometer according to the embodiment of the disclosure includes a housing 1, three charge output elements 2 disposed inside the housing 1, and a connector 3 electrically connected to the three charge output elements 2. The housing 1 is used to provide a mounting base for the charge output elements 2 and the connector 3. The housing 1 can encapsulate the charge output elements 2 therein to protect the charge output elements 2. The three charge output elements 2 are configured to detect vibrations in directions along X-axis, Y-axis, and Z-axis, respectively. The X axis, the Y axis, and the Z axis are perpendicular to each other in pairs. As shown in FIG. 3, each of the three charge output element 2 according to the present embodiment includes a support 21, a piezoelectric element 22, and a mass block 23. The support 21 according to the present embodiment includes a connecting part 21a. The piezoelectric element 22 is an annular structural body. The piezoelectric element 22 is connected to the connecting part 21a in a sheathed manner. The piezoelectric element 22 is provided with a first deformation groove 22a. The first deformation groove 22a penetrates a side wall of the piezoelectric element 22 to disconnect the piezoelectric element 22 in a circumferential direction thereof. The mass block 23 is an annular structural body. The mass block 23 is connected to the piezoelectric element 22 in the sheathed manner. The piezoelectric element 22 is in interference fit with the connecting part 21a and the mass block 23, thereby improving the overall rigidity of the charge output element 2 and improving the frequency response characteristics of the charge output element 2. The charge output element 2 is electrically connected to an external device through the connector 3, so that output signal from the charge output element 2 can be transmitted to the external device.

The three-axis piezoelectric accelerometer according to the embodiment of the disclosure includes the charge output element 2, which includes the support 21, the piezoelectric element 22, and the mass block 23. Since the piezoelectric element 22 are in direct contact with and are in interference fit with the connecting part 21a and the mass block 23, there is no need to provide an intermediate connecting layer, thereby improving the overall rigidity of the charge output element 2 and improving the frequency response characteristic of the charge output element 2, and also greatly reducing the problem of stress fluctuation when used in a high temperature environment, so as to obtain good high temperature characteristics. Thus, the three-axis piezoelectric accelerometer having the charge output element 2 has good frequency response characteristics and resonance performance, and can ensure the accuracy of the detection result.

As shown in FIG. 2, the housing 1 according to the embodiment of the disclosure is provided with an accommodating portion 11. The accommodating portion 11 has an opening. The three-axis piezoelectric accelerometer further includes a support base 4 disposed inside the accommodating portion 11. The support base 4 includes a base portion 41 and a convex column 42 connected to the base portion 41. The base portion 41 is connected to a portion of the bottom of the housing 1 forming the accommodating portion 11. The convex column 42 extends toward the opening. One of the three charge output elements 2 is disposed on the base portion 41, and the other two of the three charge output elements 2 are disposed on the convex column 42. The charge output elements 2 are mounted and fixed to the convex column 42 by the support 21.

In one embodiment, one of the three charge output elements 2 is disposed on a surface of the base portion 41 on which the convex column 42 is disposed. The convex column 42 includes a regular quadrangular prism section connected to the base portion 41 and a cylindrical section connected to the regular quadrangular prism section. The other two of the three charge output elements 2 are respectively disposed on two adjacent perpendicular side walls of the regular quadrangular prism section, such that the two charge output elements 2 have detection directions perpendicular to each other. In the present embodiment, the base portion 41 of the support base 4 and the surface of the bottom of the housing 1 forming the accommodating portion 11 are connected by welding. The housing 1 according to the present embodiment is made of a titanium alloy material.

The three-axis piezoelectric accelerometer according to the embodiment of the disclosure further includes a lid 5 for closing or opening the opening of the accommodating portion 11. A mounting hole 51 is provided in central portion of the lid 5. When the lid 5 is disposed to cover the opening, the top of the convex column 42 of the support base 4 is inserted into the mounting hole 51 and is connected to a hole wall of the mounting hole 51. In the present embodiment, after the support base 4 and the charge output element 2 are mounted and fixed inside the housing 1, the lid 5 is covered to the opening, and at the same time, the cylindrical section of the convex column 42 is aligned with the mounting hole 51 of the lid 5 and is inserted into the mounting hole 51. Then, the accommodating portion 11 is filled with a protective gas such as nitrogen. After completion of the filling operation, the outer peripheral surface of the lid 5 and the housing 1, and the cylindrical section of the convex column 42 and the hole wall of the mounting hole 51 are respectively connected and fixed by welding, thereby ensuring the accommodating portion 11 being in a sealed state and avoiding the nitrogen from escaping. The lid 5 according to the present embodiment has a plate-like structure.

The convex column 42 according to the embodiment of the disclosure is provided with a first through hole 42a disposed coaxially with the mounting hole 51. The housing 1 is provided with a second through hole 12 disposed in alignment with the first through hole 42a. When the three-axis piezoelectric accelerometer is desired to be fixed on the surface of the structural member to be tested, the three-axis piezoelectric accelerometer is connected to the structural member to be tested by a bolt passing through the first through hole 42a and the second through hole 12, such that the bolt can fix the three-axis piezoelectric accelerometer onto the structural member to be tested, thereby ensuring direct and rigid contact between the surface of the housing 1 and the surface of the structural member to be tested. The three-axis piezoelectric accelerometer provided with the first through hole 42a and the second through hole 12 according to the present embodiment has a compact structure and is easy to mount and connect.

The support 21 according to the embodiment of the disclosure includes the connecting part 21a and a supporting part 21b. The connecting part 21a has a columnar structure. The supporting part 21b has a disk-like structure disposed around the connecting part 21a and is located at one end of the connecting part 21a. Two of the three charge output elements 2 are mounted and fixed to the convex column 42 of the support base 4 via the supporting part 21b of the support 21. An outer wall surface of the connecting part 21a is provided with a positioning protrusion along a circumferential direction thereof. The positioning protrusion has a height higher than a height of the supporting part 12, and forms a stepped structure together with the supporting part 21b. The piezoelectric element 22 is an annular structural body. The piezoelectric element 22 includes opposing inner and outer annular surfaces, and each of the inner annular surface and the outer annular surface is provided with a conductive layer, to facilitate the transmission of electrical signal of the piezoelectric element 22. The inner annular surface of the piezoelectric element 22 is connected to the connecting part 21a in the sheathed manner and the lower end of the piezoelectric element 22 abuts against the positioning protrusion. The positioning protrusion facilitates the positioning support of the piezoelectric element 22. The inner annular surface of the piezoelectric element 22 has a diameter smaller than a diameter of the connecting part 21a. In the present embodiment, the support 21 is made of chrome. The piezoelectric element 22 is made of a piezoelectric ceramic. The conductive layer may be a gold plating layer.

Figure 4:
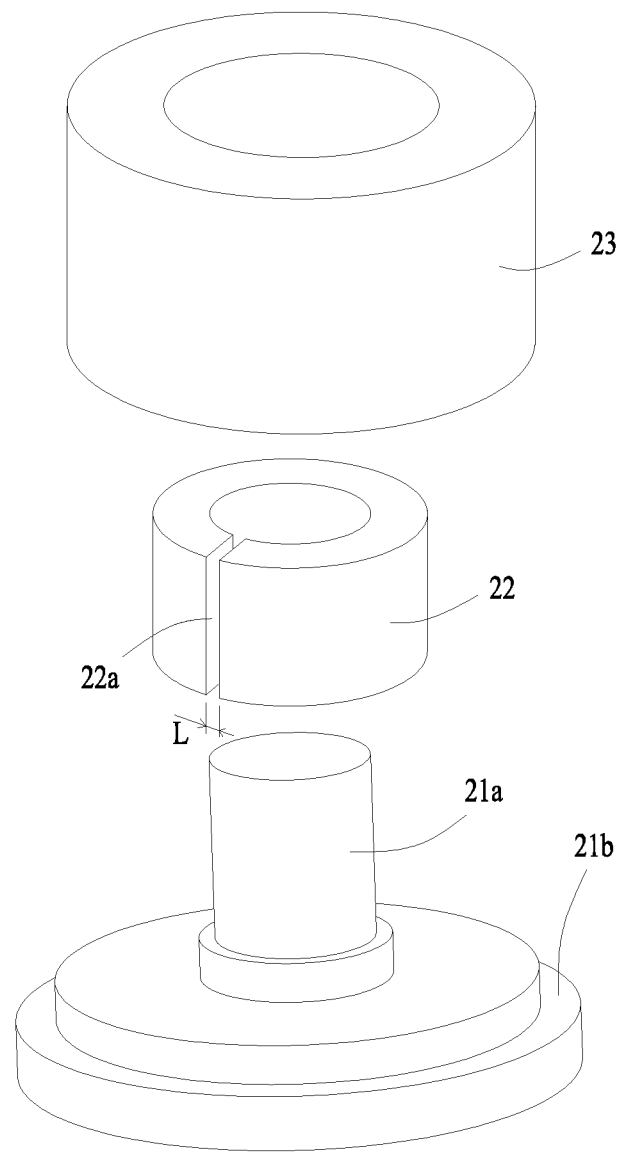
FIG. 4 is a schematic exploded view of a charge output element according to an embodiment of the disclosure.

As shown in FIG. 4, the first deformation groove 22a provided on the piezoelectric element 22 is a strip groove and extends along the axial direction of the piezoelectric element 22. Two opposing first groove sections are formed at the first deformation groove 22a of the piezoelectric element 22, and the distance L between the two opposing first groove sections is 0.2 mm, which facilitates processing and assembly while ensuring that the piezoelectric element 22 has a larger deformation amount. The mass block 23 includes opposing inner and outer annular surfaces. The inner annular surface of the mass block 23 is connected to the outer annular surface of the piezoelectric element 22 in the sheathed manner, and the mass block 23 is disposed to be suspended above the supporting part 21b. The inner annular surface of the mass block 23 has a diameter smaller than a diameter of the outer annular surface of the piezoelectric element 22, such that the piezoelectric element 22 is in interference fit with the mass block 23 and the connecting part 21a. In the present embodiment, the mass block 23 is made of a tungsten alloy and is an annular structural body.

In the charge output element 2 according to the embodiment of the disclosure, the piezoelectric element 22 is in interference fit with the connecting part 21a of the support 21 and the mass block 23, and therefore, there is no need for the connection via the connecting layers. That is to say, the piezoelectric element 22, the mass block 23 and the support 21 are in rigid contact with each other, so that the connection strength is high, the overall rigidity of the charge output element 2 can be effectively improved, thus improving the frequency response characteristics and resonance of the three-axis piezoelectric accelerometer. Moreover, the first deformation groove 22a provided on the piezoelectric element 22 to disconnect the piezoelectric element 22 in the circumferential direction causes the piezoelectric element 22 to have a greater deformation amount so as to facilitate the assembly of the piezoelectric element 22. The first deformation groove 22a implemented as the strip groove and extending along the axial direction of the piezoelectric element 22 facilitates the processing and can reduce the influence on the overall performance of the charge output element 2 when the piezoelectric element 22 is deformed.

It is to be understood that the first deformation groove 22a is not limited to the strip groove. In some alternative embodiments, the first deformation groove 22a may be a toothed groove or an irregular groove. The first deformation groove 22a is not limited to extending along the axial direction of the piezoelectric element 22, and may intersect the axis of the piezoelectric element 22, as long as the first deformation groove 22a penetrates the side wall of the piezoelectric element 22 to enable the piezoelectric element 22 to be disconnected in the circumferential direction so that the piezoelectric element 22 has a larger deformation amount. The distance between the two opposing first groove sections is not limited to 0.2 mm, and in some alternative embodiments, may be less than 0.2 mm, preferably 0.1 mm, so as to better ensure the performance of the charge output element 2 while ensuring the requirement of the deformation amount of the piezoelectric element 22. The piezoelectric element 22 is not limited to being made of the piezoelectric ceramic, and in some embodiments, a single crystal such as a quartz crystal may also be possible. Moreover, the piezoelectric element 22 and the mass block 23 are not limited to the annular structural body. In some alternative embodiments, a polygonal annular structural body may also be possible. Correspondingly, the connecting part 21*a* may be a polygonal columnar structural body, as long as it can satisfy the use requirements of the charge output element 2.

Figure 5:
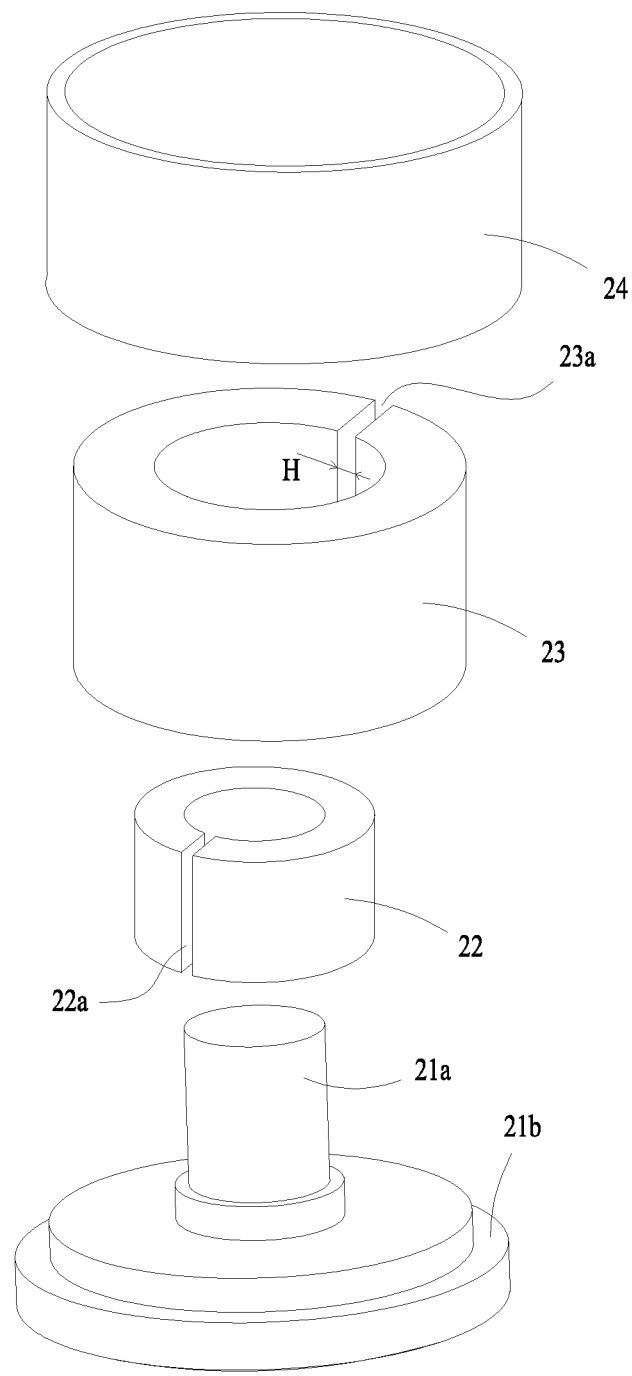
FIG. 5 is a schematic exploded view of a charge output element according to another embodiment of the disclosure.

As an alternative implementation, as shown in FIG. 5, the charge output element 2 further includes a pre-tightening ring 24. The pre-tightening ring 24 is made of a titanium alloy and is an annular structural body. The pre-tightening ring 24 includes opposing inner and outer annular surfaces. In the present embodiment, the mass block 23 is further provided with a second deformation groove 23*a*, and the second deformation groove 23*a* penetrates a side wall of the mass block 23 to disconnect the mass block 23 in the circumferential direction thereof. The second deformation groove 23*a* is a strip groove and extends along the axial direction of the mass block 23, and two opposing second groove sections are formed at the second deformation groove 23*a* of the mass block 23. The distance H between the two opposing second groove cuts is 0.2 mm, which facilitates processing and assembly while ensuring that the mass block 23 has a larger deformation amount. The pre-tightening ring 24 is connected to the mass block 23 in the sheathed manner. The inner annular surface of the pre-tightening ring 24 has a diameter smaller than a diameter of the outer annular surface of the mass block 23 to allow the pre-tightening ring 24 to be in interference fit with the mass block 23.

In the present embodiment, by providing the pre-tightening ring 24 and correspondingly providing the second deformation groove 23*a* in the mass block 23, a certain pre-tightening force can be applied to the mass block 23 to facilitate assembly of the support 21, the piezoelectric element 22 and the mass block 23, thereby improving the connection strength among the support 21, the piezoelectric element 22 and the mass block 23, improving the overall rigidity of the charge output element 2, and ensuring the frequency response characteristic of the three-axis piezoelectric accelerometer. The second deformation groove 23*a* implemented as the strip groove and extending along the axial direction of the mass block 23 facilitates processing and can reduce the influence on the overall performance of the charge output element 2 when the mass block 23 is deformed.

It is to be understood that the second deformation groove 23*a* is not limited to the strip groove. In some alternative embodiments, the second deformation groove 23*a* may be a toothed groove or an irregular groove. Moreover, the second deformation groove 23*a* is not limited to extending along the axial direction of the mass block 23, and may also intersect the axis of the mass block 23, as long as the second deformation groove 23*a* penetrates the side wall of the mass block 23 to enable the mass block 23 to be disconnected in the circumferential direction so that the mass block 23 has a larger deformation amount. The distance between the two opposing second groove sections is not limited to 0.2 mm, and in some alternative embodiments, may be less than 0.2 mm, preferably 0.1 mm, so as to better ensure the performance of the charge output element 2 while ensuring the requirement of the deformation amount of the mass block 23. The pre-tightening ring 24 is not limited to the annular structural body, and a polygonal annular structural body may be possible correspondingly to the structure of the mass block 23.

Since the pre-tightening ring 24, the mass block 23, the piezoelectric element 22, and the connecting part 21*a* of the support 21 in the charge output element 2 according to the present embodiment are made of different materials, they have different linear expansion coefficients, and since the pre-tightening ring 24, the mass block 23, the piezoelectric element 22 and the support 21 are in interference fit with each other, that is, are in rigid contact with each other, stress fluctuation on the charge output element 2 can be reduced when the charge output element 2 is applied in a high temperature environment, so that the charge output element 2 has good high temperature characteristics. Preferably, the linear expansion coefficients of the pre-tightening ring 24, the mass block 23, the piezoelectric element 22, and the connecting part 21*a* are sequentially decreased, so that the assembly efficiency of the charge output element 2 can be further improved while ensuring better high temperature characteristics of the charge output element 2.

Figure 6:
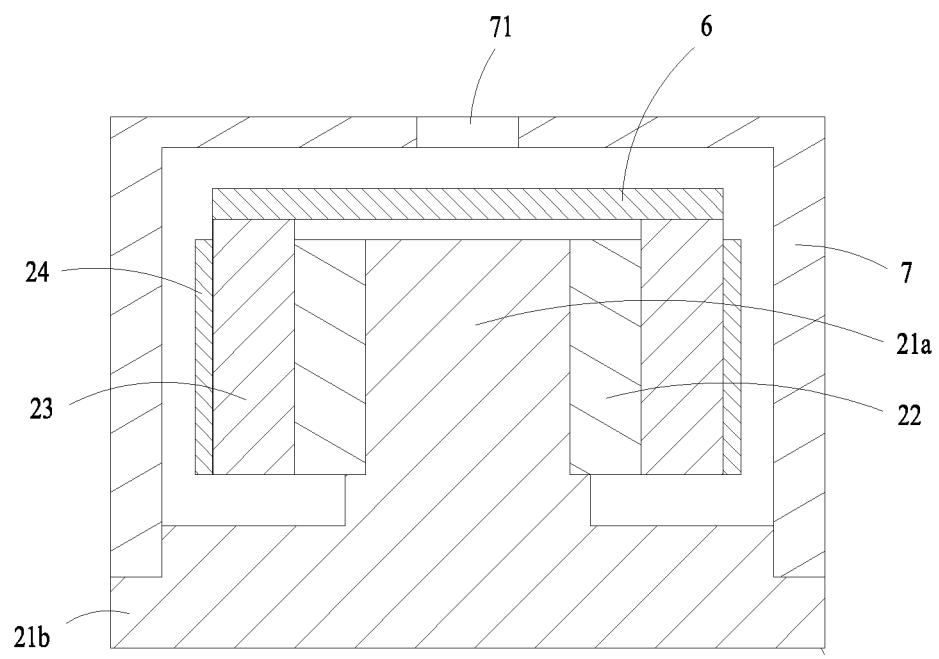
FIG. 6 is a cross-sectional structural view showing the connection among a charge output element, a circuit board, and a shielding cover according to an embodiment of the disclosure.

As an alternative embodiment, as shown in FIG. 6, the three-axis piezoelectric accelerometer further includes a circuit board 6, which is fixed on the mass block 23. At this time, the piezoelectric element 22 and the connector 3 are electrically connected to the circuit board 6. The circuit board 6 can process a weak electrical signal generated when the piezoelectric element 22 is stressed, such that the three-axis piezoelectric accelerometer constitutes a voltage-output type three-axis piezoelectric accelerometer to meet the use requirements. Moreover, a shielding cover 7 is snap-fitted on the support 21. The shielding cover 7 is a cylindrical structural body with an open end. The open end of the shielding cover 7 is snap-fitted to the support 21, specifically engages with the supporting part 21*b* of the support 21. The shielding cover 7 can cover the piezoelectric element 22, the mass block 23 and the circuit board 6, thereby avoiding external signal interference with the charge output element 2 and the circuit board 6 and ensuring the accuracy of the detection result of the three-axis piezoelectric accelerometer.

In the present embodiment, the outer annular surface of the piezoelectric element 22 is electrically connected to one leading terminal of the circuit board 6 via the mass block 23, and the inner annular surface of the piezoelectric element 22 is electrically connected to the other leading terminal of the circuit board 6 via the support 21 and the shielding cover 7. The two leading terminals have opposite polarities. A center hole 71 is provided on the top of the shielding cover 7 corresponding to the opening, and one end of the wire drawn from the leading terminals of the circuit board 6 is passed through the center hole 71 and electrically connected to the outer surface of the shielding cover 6.

By using the charge output element 2 with high overall rigidity, the three-axis piezoelectric accelerometer according to the embodiment of the disclosure can effectively improve the frequency response characteristics and resonance of the three-axis piezoelectric accelerometer, can obtain good high temperature characteristic, and can ensue the accuracy of the detection results.

Although the disclosure has been described with reference to the preferred embodiments, various modifications may be made thereto and the components may be replaced with equivalents without departing from the scope of the application. In particular, the technical features mentioned in the various embodiments can be combined in any manner as long as there is no structural conflict. The disclosure is not limited to the specific embodiments disclosed herein, but includes all technical solutions falling within the scope of the claims.

What is claimed is:

1. A three-axis piezoelectric accelerometer, comprising:
a housing, three charge output elements disposed inside the housing, and a connector electrically connected to the three charge output elements,
wherein the three charge output elements are respectively configured to detect vibrations in directions along a X-axis, a Y-axis, and a Z-axis, and the X-axis, the Y-axis, and the Z-axis are perpendicular to each other in pairs,
wherein each of the three charge output elements comprises:
a support, comprising a connecting part;
a piezoelectric element, which is an annular structural body and connected to the connecting part in a sheathed manner, wherein the piezoelectric element is provided with a first deformation groove penetrating a side wall of the piezoelectric element to disconnect the piezoelectric element in a circumferential direction thereof; and
a mass block, which is an annular structural body and is connected to the piezoelectric element in the sheathed manner, and
wherein the piezoelectric element is in interference fit with the connecting part and the mass block,
wherein the three-axis piezoelectric accelerometer further comprises a support base disposed inside an accommodating portion provided in the housing, the support base comprises a base portion connected to the housing and a convex column connected to the base portion, one of the three charge output elements is disposed on the base portion, and the other two of the three charge output elements are disposed on the convex column,
wherein the three-axis piezoelectric accelerometer further comprises a lid for closing or opening an opening of the housing, a mounting hole is provided on the lid, and a top of the convex column is inserted into the mounting hole and connected to a hole wall of the mounting hole, and
wherein the convex column is provided with a first through hole coaxially disposed with the mounting hole, and the housing is provided with a second through hole disposed in alignment with the first through hole.

2. The three-axis piezoelectric accelerometer according to claim 1, wherein the mass block is provided with a second deformation groove penetrating a side wall of the mass block to disconnect the mass block in a circumferential direction thereof, and each of the three charge output elements further comprises a pre-tightening ring which is connected to the mass block in the sheathed manner and is in interference fit with the mass block.

3. The three-axis piezoelectric accelerometer according to claim 2, wherein the first deformation groove is a strip groove and extends along an axial direction of the piezoelectric element, and the second deformation groove is a strip groove and extends along an axial direction of the mass block, and each of the first deformation groove and the second deformation groove has a width no more than 0.2 mm, and the width is the distance between two opposite sections formed at the first deformation groove or the second deformation groove.

4. The three-axis piezoelectric accelerometer according to claim 2, wherein linear expansion coefficients of the pre-tightening ring, the mass block, the piezoelectric element, and the connecting part decrease sequentially.

5. The three-axis piezoelectric accelerometer according to claim 2, wherein the piezoelectric element is made of a piezoelectric ceramic or a quartz crystal, and the piezoelectric element comprises opposing inner and outer annular surfaces, each of the inner annular surface and the outer annular surface is provided with a conductive layer, the inner annular surface of the piezoelectric element is connected to the connecting part in the sheathed manner, and the mass block is connected to the outer annular surface of the piezoelectric element in the sheathed manner.

6. The three-axis piezoelectric accelerometer according to claim 2, wherein the support further comprises a supporting part, the connecting part has a columnar structure, and the supporting part has a disc-like structure disposed around the connecting part and is located at one end of the connecting part.

7. The three-axis piezoelectric accelerometer according to claim 1, further comprising a circuit board and a shielding cover, wherein the circuit board is fixed to the mass block, the piezoelectric element and the connector are electrically connected to the circuit board, the shielding cover is snap-fitted to the support, and the piezoelectric element, the mass block and the circuit board are all located inside the shielding cover.

8. The three-axis piezoelectric accelerometer according to claim 3, wherein the piezoelectric element is made of a piezoelectric ceramic or a quartz crystal, and the piezoelectric element comprises opposing inner and outer annular surfaces, each of the inner annular surface and the outer annular surface is provided with a conductive layer, the inner annular surface of the piezoelectric element is connected to the connecting part in the sheathed manner, and the mass block is connected to the outer annular surface of the piezoelectric element in the sheathed manner.

9. The three-axis piezoelectric accelerometer according to claim 4, wherein the piezoelectric element is made of a piezoelectric ceramic or a quartz crystal, and the piezoelectric element comprises opposing inner and outer annular surfaces, each of the inner annular surface and the outer annular surface is provided with a conductive layer, the inner annular surface of the piezoelectric element is connected to the connecting part in the sheathed manner, and the mass block is connected to the outer annular surface of the piezoelectric element in the sheathed manner.

10. The three-axis piezoelectric accelerometer according to claim 3, wherein the support further comprises a supporting part, the connecting part has a columnar structure, and the supporting part has a disc-like structure disposed around the connecting part and is located at one end of the connecting part.

11. The three-axis piezoelectric accelerometer according to claim 4, wherein the support further comprises a supporting part, the connecting part has a columnar structure, and the supporting part has a disc-like structure disposed around the connecting part and is located at one end of the connecting part.

* * * * *